US011276956B2

(12) United States Patent
Yamada

(10) Patent No.: US 11,276,956 B2
(45) Date of Patent: Mar. 15, 2022

(54) CONNECTOR WITH A PRIMARY MOLDING HAVING A PROTRUSION, A SECONDARY MOLDING ENGAGING THE PROTRUSION AND A SEALING GROOVE IN THE SECONDARY MOLDING ALIGNED WITH THE PROTRUSION

(71) Applicant: Sumitomo Wiring Systems, Ltd., Yokkaichi (JP)

(72) Inventor: Hiroki Yamada, Yokkaichi (JP)

(73) Assignee: Sumitomo Wiring System, Ltd, Yokkaichi (JP)

( * ) Notice: Subject to any disclaimer, the term of this patent is extended or adjusted under 35 U.S.C. 154(b) by 0 days.

(21) Appl. No.: 16/907,397

(22) Filed: Jun. 22, 2020

(65) Prior Publication Data
US 2020/0412049 A1 Dec. 31, 2020

(30) Foreign Application Priority Data
Jun. 26, 2019 (JP) .............................. JP2019-118153

(51) Int. Cl.
*H01R 13/52* (2006.01)
*H01R 13/502* (2006.01)
(52) U.S. Cl.
CPC ....... *H01R 13/5219* (2013.01); *H01R 13/502* (2013.01)

(58) Field of Classification Search
CPC .......................... H01R 13/5219; H01R 13/502
See application file for complete search history.

(56) References Cited

U.S. PATENT DOCUMENTS

| 6,187,242 B1* | 2/2001 | Onoda | B29C 45/14639 264/255 |
| 2020/0161797 A1* | 5/2020 | Kitai | H02K 7/14 |
| 2020/0391413 A1* | 12/2020 | Yamada | H01R 13/405 |
| 2020/0403345 A1* | 12/2020 | Yamada | H01R 43/24 |
| 2021/0155612 A1* | 5/2021 | Danjo | A61K 31/44 |

FOREIGN PATENT DOCUMENTS

JP 2016-154072 8/2016

* cited by examiner

*Primary Examiner* — Abdullah A Riyami
*Assistant Examiner* — Nader J Alhawamdeh
(74) *Attorney, Agent, or Firm* — Gerald E. Hespos; Matthew T. Hespos; Michael J. Porco

(57) ABSTRACT

It is aimed to suppress the formation of sinks and voids in a sealing groove. A connector (20) includes terminals (31, 32), a primary molding portion 40 holding the terminals (31, 32) and a secondary molding portion (50) holding primary molding portion (40). The secondary molding portion (50) is formed with a sealing groove (54). A protrusion (40P) is formed at a position of the primary molding portion (40) corresponding to the sealing groove (54).

8 Claims, 4 Drawing Sheets

CONNECTOR WITH A PRIMARY MOLDING HAVING A PROTRUSION, A SECONDARY MOLDING ENGAGING THE PROTRUSION AND A SEALING GROOVE IN THE SECONDARY MOLDING ALIGNED WITH THE PROTRUSION

BACKGROUND

Field of the Invention

The present disclosure relates to a connector.

Related Art

Japanese Unexamined Patent Publication No. 2016-154072 discloses a terminal structure with a terminal and a housing. The housing is molded with a core holding the terminal as an insert.

It is requested in some cases to provide a waterproof structure around a housing. Waterproofing could be achieved by forming the housing with a groove and positioning a water sealant or waterproof ring in the groove. However, sinks or voids may be formed in the groove.

Accordingly, the present disclosure aims to suppress the formation of sinks and voids in a sealing groove.

SUMMARY

This disclosure is directed to a connector with a terminal, a primary molding portion holding the terminal, and a secondary molding portion holding the primary molding portion. The secondary molding portion is formed with a sealing groove, and a protrusion is formed at a position of the primary molding portion corresponding to the sealing groove. Thus, a volume of a part for forming the sealing groove is reduced. In this way, resin sinks, voids and the like are suppressed and the formation of sinks and voids in the sealing groove is suppressed.

The sealing groove may be formed annularly in the secondary molding portion. The primary molding portion may be held by the secondary molding portion at a position of a circumferential part of the sealing groove, and the protrusion may be formed at a position corresponding to the circumferential part of the sealing groove where the primary molding portion is held. There is a concern that the secondary molding portion is thickened and sinks and voids are formed at a location of the secondary molding portion where the primary molding portion is held. Accordingly, if the protrusion is formed at the position corresponding to the circumferential part of the sealing groove where the primary molding portion is held, the formation of sinks and voids is suppressed effectively.

The primary molding portion may include plural divided primary molding portions, and the protrusion may include divided protrusions formed on at least two of the divided primary molding portions. If the primary molding portion includes the plural divided primary molding portions, the protrusion along the sealing groove is constituted by the plural divided protrusions.

The at least two divided protrusions may be arranged along an extending direction of the sealing groove to be kept at a fixed distance from a bottom of the sealing groove with the plurality of divided primary molding portions held by the secondary molding portion. Thus, a thickness between the bottom of the sealing groove and the protrusion is fixed. In this way, the formation of resin sinks and voids in the secondary molding portion is suppressed.

According to the present disclosure, the formation of sinks or voids in the sealing groove is suppressed.

DETAILED DESCRIPTION

An example of the connector of this disclosure is described below with reference to the drawings. Note that the present disclosure is not limited to these illustrations and is intended to be represented by claims and include all changes in the scope of claims and in the meaning and scope of equivalents.

Figure 1:
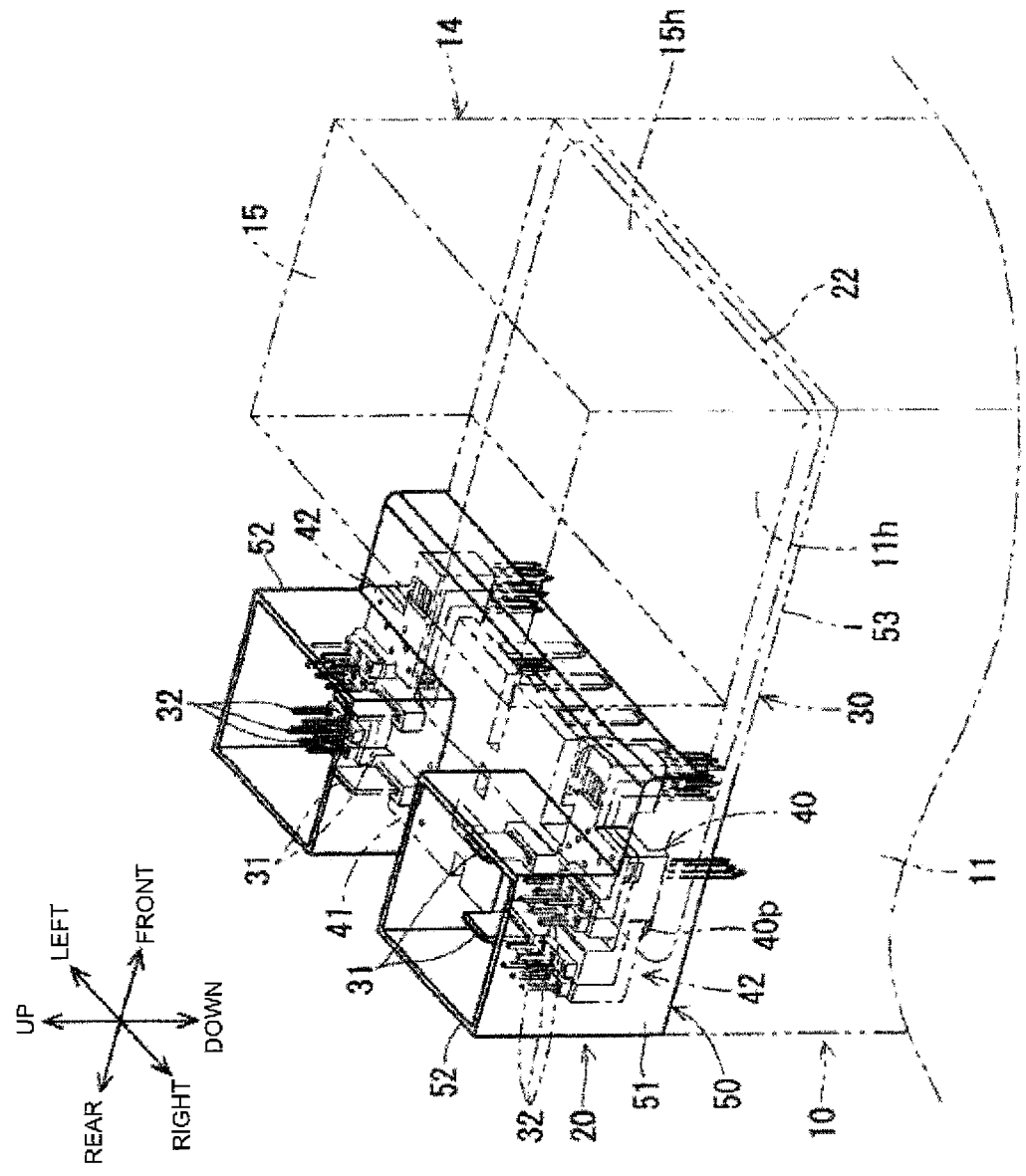
FIG. 1 is a perspective view showing a connector according to an embodiment.
Figure 2:
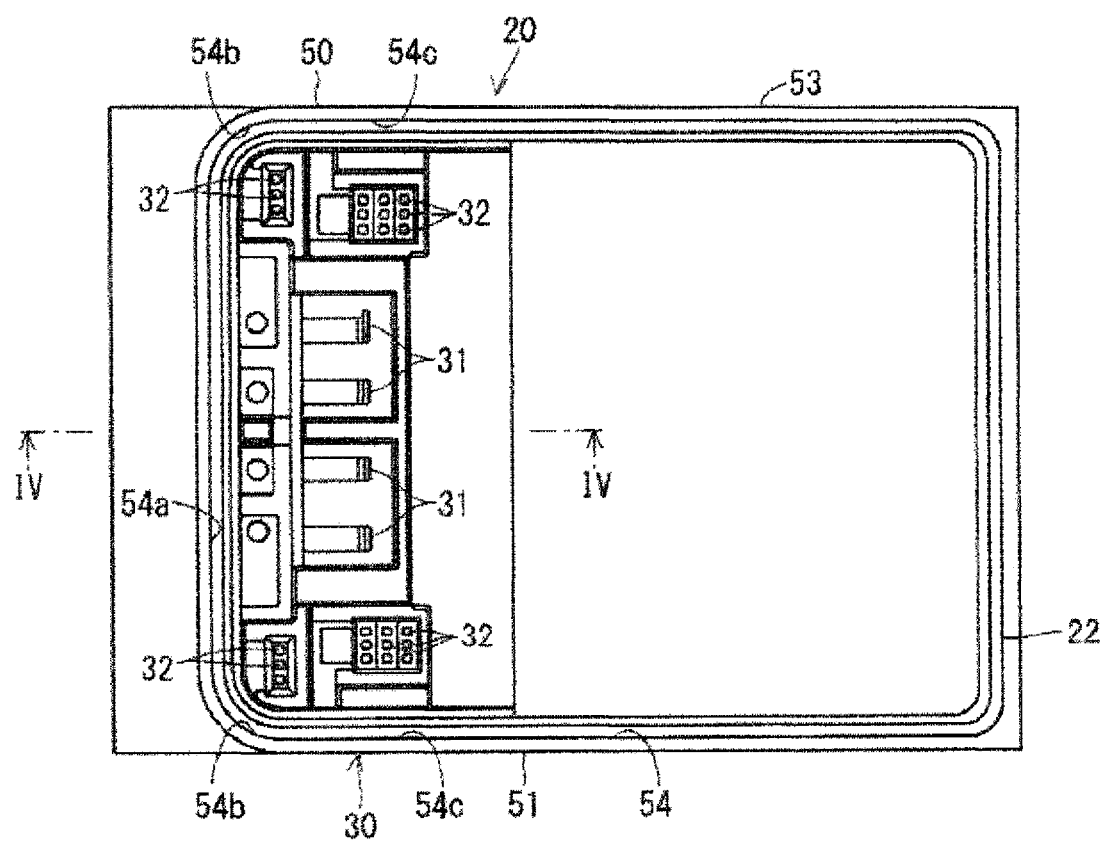
FIG. 2 is a bottom view of the connector.
Figure 2:
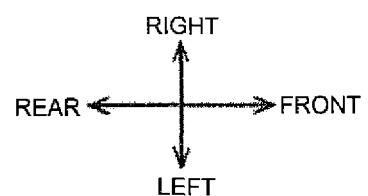

FIG. 1 is a perspective view showing a connector 20. FIG. 2 is a bottom view of the connector 20. Note that the connector 20 and a second device 14 are provided on a first device 10 in FIG. 1. In FIG. 1, a primary molding portion 40 inside is shown by two-dot chain line. In the following description, a side where the connector 20 and the second device 14 are provided with respect to the first device 10 is referred to as an upper side, and an opposite side thereof is referred to as a lower side. Further, a side where the second device 14 is provided with respect to the connector 20 is referred to as a front, and an opposite side thereof is referred to as a rear. Further, left and right sides are referred to based on a forward-facing state.

In this embodiment, a terminal waterproof structure 30 is applied to the connector 20 for the first device 10. The first device 10 includes a case 11 for accommodating an electrical component. An opening 11h is provided in an upper side of the case 11, and the connector 20 is mounted to close the opening 11h.

The connector 20 includes terminals 31, 32. One end part of each terminal 31, 32 is exposed upwardly of the connector 20 and is connected to a wiring outside the first device 10 via a connector connection or the like. The other end part of each terminal 31, 32 is exposed below the connector 20 and is disposed in the case 11 through the opening 11h. The other end of each terminal 31, 32 is connected to a wiring in the first device 10 via connector connection or the like. Thus, the terminals 31, 32 of the connector 20 can function to relay and connect the wiring in the first device 10 and the wiring outside the first device 10.

A seal 22 is provided on a part of the connector 20 facing a peripheral edge of the opening 11h of the case 11 to surround the terminals 31, 32. The seal 22 is interposed between the peripheral edge of the opening 11h of the case 11 and an annular facing part of the connector 20 to seal a clearance, thereby suppressing the intrusion of water through a joint of the case 11 and the connector 20.

The second device 14 is adjacent to a part of the connector 20 where the terminals 31, 32 are held and includes a case 15 for accommodating an electrical component. An opening 15h is provided in a lower side of the case 15 and is open adjacent to the terminals 31, 32. The opening 15h is open toward a region surrounded by the seal 22. Here, the case 15 is fixed to a secondary molding portion 50 of the connector 20 by screwing or the like. However, the case 15 may be molded integrally to the secondary molding portion 50 of the connector 20. The seal 22 surrounds not only around the terminals 31, 32, but also surrounds the opening 15h of the case 15. Thus, the seal 22 also suppresses the intrusion of water into an assembled part of the first and second devices 10, 14 between the case 11 and the connector 20.

The second device 14 may be omitted. In this case, a seal only has to surround around the terminals 31, 32.

The connector 20 includes the terminals 31, 32, the primary molding portion 40 and the secondary molding portion 50.

The terminals 31, 32 are formed from long metal plates, such as a copper plates, that are cut to define strips. The terminals 31 are formed by press-working to bend thick metal strips in a thickness direction to define bent paths. The terminals 32 are thinner than the terminals 31 and are formed by press-working to bend thin metal strips in a thickness direction to define bent paths. An intermediate part of each terminal 31, 32 in an extending direction is embedded at least in the primary molding portion 40 in a straight or bent state.

Both end parts of the terminals 31 are in the form of flat plates, while end parts of the terminals 32 are in the form of pins. The end parts of each terminal 31, 32 are inserted in and connected to mating female terminals. However, the end parts of the terminals 31, 32 may be formed into a tubular female terminal shape or may be parts to be fixed to mating conductive members by soldering or screwing.

The primary molding portion 40 is made of an insulating material, such as resin, and is molded with the terminals 31, 32 as inserts to hold the terminals 31, 32. However, it is not essential that the terminals 31, 32 are inserts during molding. For example, terminals may be mounted into a primary molding portion after the primary molding portion is molded. In this case, the primary molding portion may be formed with recesses for setting the terminals or positioning projections.

The secondary molding portion 50 is made of an insulating material, such as resin, and is molded with the primary molding portion 40 as an insert so that the secondary molding portion 50 holds the primary molding portion 40. The secondary molding portion 50 includes a secondary molding body 51, tubular portions 52 and a frame 53.

The secondary molding body 51 has a larger dimension than the frame 53 in a vertical direction. The primary molding portion 40 is embedded in this secondary molding body 51. The primary molding portion 40 may or may not be partially exposed from the secondary molding portion 50. Here, the primary molding portion 40 is exposed partially below the secondary molding body 51.

The secondary molding portion 50 is molded so that the primary molding portion 40 holding the terminals 31, 32 is embedded in the secondary molding body 51. Thus, the terminals 31, 32 are held at fixed positions with respect to the secondary molding portion 50. One end part of each terminal 31, 32 is supported to project into the first device 10 from a lower part of the primary molding portion 40 or the secondary molding body 51. For example, the one end part of each terminal 31, 32 may be inserted and connected to a mating terminal in the case 11 when the connector 20 is mounted on the case 11 of the first device 10.

The tubular portions 52 are formed above the secondary molding body 51. Here, two tubular portions 52 are formed at a distance from each other. The terminals 31, 32 are supported so that one end part of each terminal 31, 32 projects from the bottom of each tubular portion 52. External mating connectors are connected to the tubular portions 52 so that the one end part of each terminal 31, 32 is connected to a corresponding terminal in the mating connector.

The frame 53 in this embodiment has a rectangular shape and extends towards the front from the secondary molding body 51. The frame 53 extends around the peripheral edge of the opening 11h of the case 11.

The secondary molding body 51 holds the secondary molding portion 40 at a fixed position together with the terminals 31, 32 and is thicker than the tubular portions 52.

A sealing groove 54 is formed in the secondary molding portion 50. More particularly, the sealing groove 54 is formed along a path passing through lower parts of the tubular portions 52 and passing outside a part of the secondary molding body 51 where the other ends of the terminals 31, 32 project. Thus, the sealing groove 54 is an annular groove. The sealing groove 54 is disposed along the periphery of the opening 11h of the case 11. In a projected plan view, the other end parts of the terminals 31, 32 and the opening 15h of the case 15 are disposed in a region enclosed by the sealing groove 54. The sealing groove 54 is open downward. A transverse cross-sectional shape (cross-section in a direction orthogonal to an extending direction) of the sealing groove 54 may be rectangular, U-shaped or V-shaped.

The secondary molding body 51 is formed at a circumferential part of the sealing groove 54. Thus, the primary molding portion 40 is held by the secondary molding portion 50 in the circumferential part of the sealing groove 54.

The seal 22 is disposed in the sealing groove 54 and provides sealing between the primary molding portion 40 of the connector 20 and the case 11 while being at least partially disposed in the sealing groove 54. The seal 22 may be a sealing agent filled in the sealing groove 54 or may be an annular rubber member fit in the sealing groove 54. In either case, the seal 22 seals a clearance between the case 11 and the connector 20 outside and around the opening 11h while being positioned by the sealing groove 54.

As described above, a part of the secondary molding body 51 that is formed with the sealing groove 54 is relatively thick. If a molded article is thick, sinks or voids may be formed due to the contraction of resin. The sealing groove 54 is a part for achieving waterproofing. Thus, it is desirable to suppress the formation of sinks or voids in the part formed with the sealing groove 54. In the present disclosure, a protrusion 40P is formed at a position of the primary molding portion 40 corresponding to the sealing groove 54 to suppress sinks or voids in the part of the secondary molding body portion 51 formed with the sealing groove 54.

Figure 3:
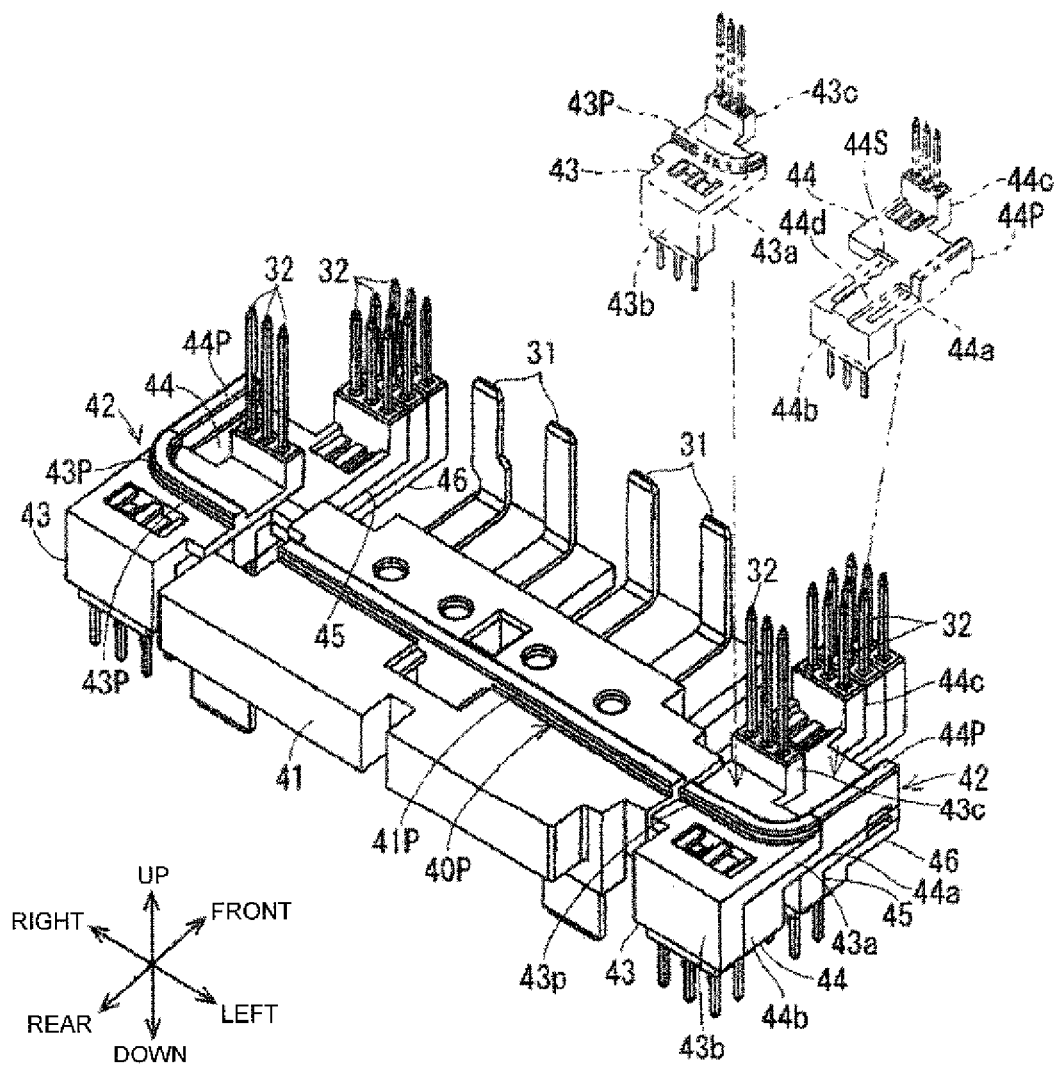
FIG. 3 is a perspective view showing a primary molding portion.
Figure 4:
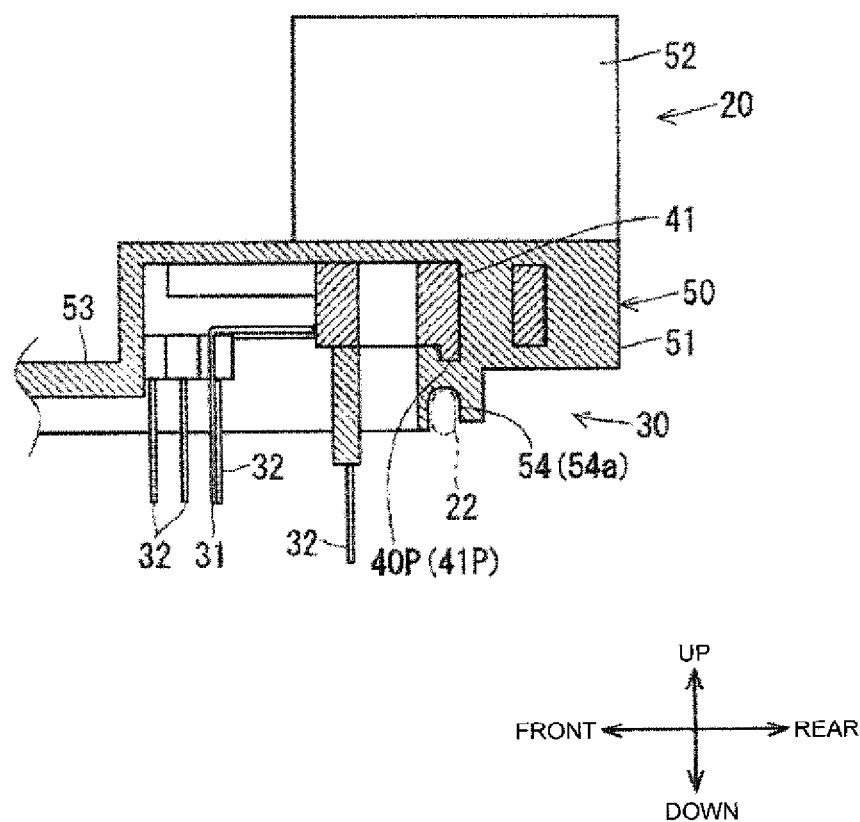
FIG. 4 is a section along IV-IV of FIG. 2.

FIG. 3 is a perspective view showing the primary molding portion 40. A vertical direction of FIG. 3 is opposite to that in FIG. 1. Further, in FIG. 3, some of components constituting the primary molding portion 40 before being united are shown by two-dot chain line. FIG. 4 is a section along VI-VI of FIG. 2.

The primary molding portion 40 is embedded in the secondary molding body 51 of the secondary molding portion 50. The primary molding portion 40 may be partially exposed from the secondary molding portion 50. Of course, the primary molding portion 40 preferably is not exposed in the part formed with the sealing groove 54 to enhance waterproofness. Further, the primary molding portion 40 preferably is not exposed in a part facing outside likewise to enhance waterproofness.

The protrusion 40P is formed at the position of the primary molding portion 40 corresponding to the sealing groove 54. Here, a part of the annular sealing groove 54 is formed in the secondary molding body 51. The part of the sealing groove 54 includes a straight portion 54a, two curved portions 54b and two straight side portions 54c in a lower part of the secondary molding body 51. The straight portion 54a has a straight shape extending in a lateral direction outside the other end parts of the terminals 31, 32. The two curved portions 54b are continuous with respective end parts of the straight portion 54a while forming a quarter circular arc. The straight side portions 54c are continuous respectively with the curved portions 54b to extend in a direction orthogonal to the straight portion 54a.

In a projected plan view of the secondary molding body 51, the primary molding portion 40 is embedded in a region where the straight portion 54a, the curved portions 54b and the straight side portions 54c of the secondary molding body portion 51 are present.

The protrusion 40P is formed in a region of the primary molding portion 40 corresponding to the straight portion 54a, the two curved portions 54b and the two straight side portions 54c and is present inwardly of the bottom of the sealing groove 54. The protrusion 40P is embedded in the secondary molding body 51 and is not exposed on the bottom surface and both side surfaces of the sealing groove 54. Thus, the entire inner surface of the sealing groove 54 is a resin surface formed when the secondary molding portion 50 is molded.

Although the protrusion 40P is present at a position inwardly of and at a distance from the bottom of the sealing groove 54 in the secondary molding body 51, this position is not essential. For example, a protrusion may be spaced from the side surface of the sealing groove 54. In either case, a volume of the resin for molding the secondary molding portion is reduced around the sealing groove 54 by the protrusion. In this way, the formation of resin sinks or voids is suppressed in the part where the sealing groove is formed.

The primary molding portion 40 may be configured as one integral part or may be configured by assembling a plurality of components. An example in which the primary molding portion 40 is configured by assembling a plurality of divided primary molding portions is described. More particularly, the primary molding portion 40 is divided into a center primary molding portion 41 and left and right divided primary molding portion groups 42, 42.

The center primary molding portion 41 is one example of the divided primary molding portions and is provided in a widthwise center of the primary molding portion 40. The center primary molding portion 41 is molded of resin with some terminals 31, out of the plurality of terminals 31, 32, as inserts. The center primary molding portion 41 is a plate that is thin in the vertical direction and elongated in the lateral direction. Intermediate parts of the terminals 31 are embedded in the center primary molding portion 41 along a front-rear direction while being bent if necessary. Both end parts of the terminals 31 are bent to project in opposite vertical directions on front and rear ends of the center primary molding portion 41. By embedding this center primary molding portion 41 in the secondary molding body 51, one end part of each terminal 31 is held in a fixed posture projecting into each tubular portion 52 above the secondary molding body 51. Further, the other end part of each terminal 31 is held in a fixed posture projecting below the secondary molding body 51.

A lower principal surface (surface facing upward in FIG. 3) of the center primary molding portion 41 with the center primary molding portion 41 embedded in the secondary molding portion 50 is disposed inwardly of the straight portion 54a of the sealing groove 54. A straight divided protrusion 41P along the lateral direction is formed on a part of the lower principal surface of the center primary molding portion 41 located inward of the straight portion 54a of the sealing groove 54.

The divided primary molding portion groups 42, 42 are provided respectively on left and right sides of the center primary molding portion 41. The left and right divided primary molding portion groups 42, 42 are shaped bilaterally symmetrically. The following description is centered on the left divided primary molding portion group 42.

The divided primary molding portion group 42 includes a first divided primary molding portion 43, a second divided primary molding portion 44, a third divided primary molding portion 45 and a fourth divided primary molding portion 46. The divided primary molding portion group may be composed of a smaller number of molding portions or a larger number of molding portions. The divided primary molding portion group may be composed of one divided primary molding portion.

Each of the first, second, third and fourth divided primary molding portions 43, 44, 45 and 46 is one example of the divided primary molding portions. Each of the divided primary molding portions 43, 44, 45 and 46 is molded of resin with some of the terminals 32 as inserts. Intermediate parts of the divided primary molding portions 43, 44, 45 and 46 are this vertical plates. Front and rear end parts of the divided primary molding portions 43, 44, 45 and 46 project in opposite vertical directions. Each of the divided primary molding portions 43, 44, 45 and 46 has intermediate parts of the terminals 32 embedded therein. Further, both end parts of the terminals 32 project in opposite vertical directions in the front and rear end parts of the respective divided primary molding portion 43, 44, 45, 46.

Plate-like intermediate parts of the divided primary molding portions 43, 44, 45 and 46 are stacked in the vertical direction. In a stacked state, the front and rear end parts of the divided primary molding portions 43, 44, 45 and 46 are in contact with each other. If necessary, the plate-like intermediate parts of the divided primary molding portions 43, 44, 45 and 46 are formed with positioning recesses or projections to be fit to each other. The divided primary molding portions 43, 44, 45 and 46 are held in mutually fixed positional relationships by these contact and positioning structures.

With the left and right divided primary molding portion groups 42, 42, in which the divided primary molding portions 43, 44, 45 and 46 are combined, embedded in the secondary molding portion 50, one end part of each terminal 32 is held in a fixed posture projecting into each tubular portion 52 above the secondary molding body 51. Further, the other end part of each terminal 32 is held in a fixed posture projecting below the secondary molding body 51.

Focusing on the first and second divided primary molding portions 43, 44, divided protrusions 43P, 44P formed on the divided primary molding portion groups 42, 42 are described.

The second divided primary molding portion 44 includes an intermediate holding portion 44a, an upper projecting portion 44b and a lower projecting portion 44c. The intermediate holding portion 44a is a plate that is long in the front-rear direction and is formed into an L shape with a front part that projects near a center in a plan view. A lower principal surface (upper surface in FIG. 3) of the intermediate holding portion 44a near a rear end is recessed from the lower principal surface of the intermediate holding portion 44a near a front end via a step 44S. A positioning protrusion 44d is formed on the lower principal surface of the intermediate holding portion 44a near the rear end and is elongated along the front-rear direction. The upper projecting portion 44b projects from a rear part of the intermediate holding portion 44a, and the lower projecting portion 44c projects from a front part of the intermediate holding portion 44a. The upper and lower projecting portions 44b, 44c project in opposite vertical directions. With the intermediate parts of the terminals 32 embedded in the intermediate holding portion 44a, one end part of each terminal 32 projects from the upper projecting portion 44b and the other end part thereof projects from the lower projecting portion 44c.

The first divided primary molding portion 43 includes an intermediate holding portion 43a, an upper projecting portion 43b and a lower projecting portion 43c. The intermediate holding portion 43a is in the form of a plate. A positioning groove is formed in an upper principal surface (downward facing surface hidden in FIG. 3) of the intermediate holding portion 43a and can receive the positioning protrusion 44d. The upper projecting portion 43b projects from a rear part of the intermediate holding portion 43a, and the lower projecting portion 43c projects from a front part of the intermediate holding portion 43a. The upper and lower projecting portions 43b, 43c project in opposite vertical directions at positions shifted in the lateral direction. With the intermediate parts of the terminals 32 embedded in the intermediate holding portion 43a, one end part of each terminal 32 projects from the upper projecting portion 43b and the other end part thereof projects from the lower projecting portion 43c.

The intermediate holding portion 43a of the first divided primary molding portion 43 is stacked on the lower principal surface (recessed part via the step 44S) near the rear end of the intermediate holding portion 44a in the second divided primary molding portion 44. In this state, the positioning protrusion 44d is fit into the positioning groove of the intermediate holding portion 43a. Further, the upper projecting portions 43b and 44b are in contact with each other in the front-rear direction. In this way, the first and second divided primary molding portions 43, 44 are stacked while being positioned in the front-rear and lateral directions.

It is not essential that the divided primary molding portions 43, 44, 45 and 46 are positioned with respect to each other. This is because, in molding the secondary molding portion 50 with the divided primary molding portions 43, 44, 45 and 46 as inserts, the terminals 32 and the divided primary molding portions 43, 44, 45 and 46 can be positioned, utilizing the end parts of the terminals 32 projecting outward. The center primary molding portion 41 and the divided primary molding portion groups 42, 42 may be positioned with respect to each other by convex-concave fitting structures or the like or may not be positioned.

With the divided primary molding portion groups 42, 42 embedded in the secondary molding portion 50, the lower principal surfaces of the first divided primary molding portions 43 are inward of the end parts of the straight portion 54a and the curved portions 54b in the sealing groove 54. Each divided protrusion 43P has a straight part and a quarter circular curved part formed to be continuous on the lower principal surfaces of the first divided primary molding portions 43 inward of the end parts of the straight portion 54a and the curved portions 54b.

With the divided primary molding portion groups 42, 42 embedded in the secondary molding portion 50, the lower principal surfaces of the second divided primary molding portions 44 are inward of the straight sides 54c of the sealing groove 54. The straight divided protrusions 44P are formed on parts of the lower principal surfaces of the second divided primary molding portions 44 inwardly of the straight sides 54c.

With the center primary molding portion 41 and the divided primary molding portion groups 42, 42, which are the divided primary molding portions, embedded and held in the secondary molding portion 50, the divided protrusions 41P, 43P and 44P are arranged along an extending direction of the sealing groove 54 to be kept at a fixed distance from the bottom of the sealing groove 54.

With the center primary molding portion 41 and the divided primary molding portion groups 42, 42 embedded in the secondary molding portion 50, the lower principal surface of the center primary molding portion 41 and the lower principal surfaces of the first divided primary molding portions 43 are on the same plane. A projecting dimension of the divided protrusion 41P from the lower principal surface of the center primary molding portion 41 and those of the divided protrusions 43P from the lower principal surfaces of the first divided primary molding portions 43 are equal. Further, the lower principal surfaces of the second divided primary molding portions 44 are recessed from those of the first divided primary molding portions 43 via steps. Projecting dimensions of the divided protrusions 44P from the lower principal surfaces of the second divided primary molding portions 44 are larger than those of the divided protrusions 43P from the lower principal surfaces of the first divided primary molding portions 43 by the recess. The divided protrusions 41P, 43P and 44P are arranged along the sealing groove 54 and the lower side surfaces thereof are aligned at a fixed position in the vertical direction. Thus, the lower side surfaces of the divided protrusions 41P, 43P and 44P are kept at a fixed distance from the bottom of the sealing groove 54 so that a part of the primary molding portion 40 corresponding to the bottom of the sealing groove 54 has a fixed thickness. Note that a width of the divided protrusions 41P, 43P and 44P may be smaller than that of the sealing groove 54. The width of the divided protrusions 41P, 43P and 44P may be equal to or larger than the width of the sealing groove 54.

According to the connector 20 of this embodiment, the protrusion 40P is formed at the position of the primary molding portion 40 corresponding to the sealing groove 54. Thus, a part of the secondary molding portion 50 on the bottom of the sealing groove 54 is reduced in thickness. In other words, a volume of the part of the secondary molding portion 50 for forming the sealing groove 54 is reduced. In this way, the formation of resin sinks, voids and the like around the sealing groove 54 is suppressed in a cooling process during molding. Particularly, the avoidance of sinks, voids and the like around the sealing groove 54 ensures good waterproofing.

Further, the divided protrusions 41P, 43P and 44P partially project from a principal surface of the primary molding portion 40 in parts corresponding to the sealing groove 54. Thus, the entire primary molding portion 40 need not be enlarged and, eventually, the secondary molding portion 50 holding the primary molding portion 40 also is reduced in size.

It is considered to provide a lightening structure around the sealing groove 54 in the secondary molding portion 50 to reduce a thickness of a part around the sealing groove 54. However, this design complicates the shape of the secondary molding portion 50 and may require a slide mold. In this embodiment, the part around the sealing groove 54 can be thinned without complicating a mold structure. Thus, the formation of sinks, voids and the like in the part around the sealing groove 54 is suppressed without causing a mold cost increase.

Further, the sealing groove 54 is formed annularly in the secondary molding portion 50, and the primary molding portion 40 is held by the secondary molding portion 50 at the position of the circumferential part of the sealing groove 54. There is a concern that the secondary molding portion 50 is sufficiently thick to cause sinks and voids to form at a location of the secondary molding portion 50 that holds the primary molding portion 40. However, in this embodiment, the protrusion 40P is formed at the position corresponding to the circumferential part of the sealing groove 54 where the primary molding portion 40 is held. Thus, the protrusion 40P prevents sinks and voids in the part of the secondary molding portion 50 where the primary molding portion 40 is held, i.e. the part of the secondary molding portion 50 that otherwise would be too thick.

In contrast, the part around the sealing groove 54 formed in the frame 53 can be thinned easily. Thus, sinks, voids and the like are less likely to be formed.

Further, the primary molding portion 40 includes the center primary molding portion 41 and the divided primary molding portions 43, 44, 45 and 46 as the divided primary molding portions. In this case, the protrusion 40P includes the divided protrusions 41P, 43P and 44P formed on the center primary molding portion 41 and the first and second divided primary molding portions 43, 44, which are at least two of the plurality of divided primary molding portions. Thus, when the primary molding portion 40 includes the plurality of divided primary molding portions, the protrusion 40P along the sealing groove 54 is constituted by the plurality of divided protrusions 41P, 43P and 44P.

Further, with the center primary molding portion 41 and the divided primary molding portions 43, 44, 45 and 46 held by the secondary molding portion 50, the divided protrusions 41P, 43P and 44P are arranged along the extending direction of the sealing groove 54 to be kept at a fixed distance from the bottom of the sealing groove 54. Thus, a thickness between the bottom of the sealing groove 54 and the protrusion 40P is fixed. In this way, the formation of resin sinks and voids in the secondary molding portion 50 is suppressed.

Note that the respective configurations described in the above embodiment and respective modifications can be combined as appropriate without contradicting each other.

LIST OF REFERENCE SIGNS

10 first device
11 case
11*h* opening
14 second device
15 case
15*h* opening
20 connector
22 seal
30 terminal waterproof structure
31 terminal
32 terminal
40 primary molding portion
40P protrusion
41 center primary molding portion
41P divided protrusion
42 divided primary molding portion group
43 first divided primary molding portion
43P divided protrusion
43*a* intermediate holding portion
43*b* upper projecting portion
43*c* lower projecting portion
44 second divided primary molding portion
44P divided protrusion
44S step
44*a* intermediate holding portion
44*b* upper projecting portion
44*c* lower projecting portion
44*d* positioning protrusion
45 third divided primary molding portion
46 fourth divided primary molding portion
50 secondary molding portion
51 secondary molding body
52 tubular portion
53 frame
54 sealing groove
54*a* straight portion
54*b* curved portion
54*c* straight side portion

What is claimed is:

1. A connector, comprising:
a terminal;
a primary molding portion holding the terminal and having a protrusion; and
a secondary molding portion having a first surface molded around the protrusion and holding the primary molding portion,
the secondary molding portion further having a second surface opposite the first surface, the second surface of the secondary molding portion being formed with a sealing groove, wherein
the protrusion is formed at a position of the primary molding portion to extend along an extending direction of the sealing groove and at a position at least partly aligned with the sealing groove so that aligned parts of the protrusion and the sealing groove define a reduced thickness for the secondary molding portion to avoid formation of sinks.

2. The connector of claim 1, wherein:
the sealing groove is formed annularly in the secondary molding portion,
the primary molding portion is held by the secondary molding portion at a position of a circumferential part of the sealing groove, and
the protrusion is formed at a position corresponding to the circumferential part of the sealing groove where the primary molding portion is held.

3. A connector, comprising:
a terminal;
divided primary molding portions holding the terminal; and
a secondary molding portion holding the divided primary molding portions, the secondary molding portion having a sealing groove formed annularly therein, wherein:
the divided primary molding portions are held by the secondary molding portion at a position of a circumferential part of the sealing groove, and
divided protrusions formed on at least two of the divided primary molding portions and at positions corresponding to the circumferential part of the sealing groove.

4. The connector of claim 3, wherein:
the divided protrusions are arranged along an extending direction of the sealing groove and are kept at a fixed distance from a bottom of the sealing groove with the divided primary molding portions held by the secondary molding portion.

5. A connector, comprising:
   terminals;
   primary molding portions holding the terminals; and
   a secondary molding portion holding the primary molding portions, wherein:
   the secondary molding portion is formed with a sealing groove,
   at least two divided protrusions formed at positions of the primary molding portions corresponding to the sealing groove,
   the divided protrusions are arranged along an extending direction of the sealing groove and are kept at a fixed distance from a bottom of the sealing groove with the divided primary molding portions held by the secondary molding portion.

6. The connector of claim 1, wherein the protrusion projects in a projecting direction toward the sealing groove so that the projection aligns with at least part of the sealing groove in the projecting direction.

7. The connector of claim 1, wherein the sealing groove extends into the second surface of the secondary molding portion in a depth direction, the depth direction of the sealing groove extending toward a surface of the primary molding portion from which the protrusion projects.

8. The connector of claim 7, further comprising a seal mounted in the sealing groove and projecting beyond the second surface of the secondary molding portion.

* * * * *